US009119183B2

(12) United States Patent
Guo

(10) Patent No.: US 9,119,183 B2
(45) Date of Patent: Aug. 25, 2015

(54) METHOD AND APPARATUS FOR ALLOCATING BEARER RESOURCES

(75) Inventor: Jing Guo, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 392 days.

(21) Appl. No.: 13/643,179

(22) PCT Filed: Oct. 12, 2010

(86) PCT No.: PCT/CN2010/077687
§ 371 (c)(1),
(2), (4) Date: Oct. 24, 2012

(87) PCT Pub. No.: WO2011/150615
PCT Pub. Date: Dec. 8, 2011

(65) Prior Publication Data
US 2013/0064078 A1 Mar. 14, 2013

(30) Foreign Application Priority Data
Jun. 4, 2010 (CN) .......................... 2010 1 0194438

(51) Int. Cl.
H04W 28/02 (2009.01)
H04W 76/02 (2009.01)
(Continued)

(52) U.S. Cl.
CPC ............ *H04W 76/025* (2013.01); *H04W 28/06* (2013.01); *H04W 72/042* (2013.01); *H04W 72/0413* (2013.01); *H04W 72/0453* (2013.01)

(58) Field of Classification Search
CPC .................................................. H04W 28/06

USPC ................. 370/230, 252, 229, 315, 329, 331, 370/230.1, 236, 232; 709/228, 227, 229; 455/450, 452.1, 452.2, 404.1, 458
See application file for complete search history.

(56) References Cited

U.S. PATENT DOCUMENTS 7,023,825 B1* 4/2006 Haumont et al. ............. 370/338
2004/0042394 A1* 3/2004 Nielsen et al. ................ 370/218
(Continued)

FOREIGN PATENT DOCUMENTS

| CN | 101170807 A | 4/2008 |
| CN | 101365159 A | 2/2009 |

(Continued)

OTHER PUBLICATIONS

International Search Report for PCT/CN2010/077687 dated Feb. 23, 2011.

*Primary Examiner* — Parth Patel
(74) *Attorney, Agent, or Firm* — Ling Wu; Stephen Yang; Ling and Yang Intellectual Property

(57) ABSTRACT

The invention discloses a method and apparatus for allocating bearer resources, and relates to LTE system in the communication field. The method comprises: when a network side receives a bearer resource allocation request initiated by a user, if the number of currently activated EPS bearers has reached or exceeded a set upper limit, the network side searching the currently activated EPS bearers according to a QCI carried in the bearer resource allocation request, and if an EPS bearer corresponding to a QCI consistent with the QCI carried in the bearer resource allocation request is found, performing a proprietary bearer modification operation on the found EPS bearer to respond to the bearer resource allocation request.

7 Claims, 4 Drawing Sheets

(51) Int. Cl.
*H04W 28/06* (2009.01)
*H04W 72/04* (2009.01)

(56) References Cited

U.S. PATENT DOCUMENTS

| | | | |
|---|---|---|---|
| 2006/0133307 A1* | 6/2006 | Fukasawa et al. | 370/328 |
| 2008/0273520 A1* | 11/2008 | Kim et al. | 370/345 |
| 2009/0016344 A1* | 1/2009 | Hu et al. | 370/389 |
| 2009/0129342 A1* | 5/2009 | Hwang et al. | 370/331 |
| 2009/0232019 A1* | 9/2009 | Gupta et al. | 370/252 |
| 2010/0034083 A1* | 2/2010 | Prakash et al. | 370/230.1 |
| 2010/0074109 A1* | 3/2010 | Klingenbrunn et al. | 370/230 |
| 2010/0081444 A1* | 4/2010 | Jin et al. | 455/450 |
| 2010/0103863 A1* | 4/2010 | Ulupinar et al. | 370/315 |
| 2010/0128722 A1* | 5/2010 | Madour et al. | 370/352 |
| 2010/0150003 A1* | 6/2010 | Andreasen et al. | 370/252 |
| 2010/0216484 A1* | 8/2010 | Zhou et al. | 455/450 |
| 2010/0217855 A1* | 8/2010 | Przybysz et al. | 709/223 |
| 2010/0246533 A1* | 9/2010 | Lundin et al. | 370/332 |
| 2010/0260143 A1* | 10/2010 | Tanabe et al. | 370/331 |
| 2010/0284299 A1* | 11/2010 | Bi et al. | 370/253 |
| 2010/0299433 A1* | 11/2010 | De Boer et al. | 709/224 |
| 2010/0316063 A1* | 12/2010 | Zhou et al. | 370/431 |
| 2010/0318670 A1* | 12/2010 | Al-Shalash et al. | 709/229 |
| 2010/0322069 A1* | 12/2010 | Song et al. | 370/229 |
| 2011/0044198 A1* | 2/2011 | Persson et al. | 370/252 |
| 2011/0075744 A1* | 3/2011 | Laselva et al. | 375/259 |
| 2011/0103310 A1* | 5/2011 | Stojanovski et al. | 370/328 |
| 2011/0111767 A1* | 5/2011 | Livanos | 455/452.2 |
| 2011/0141890 A1* | 6/2011 | Giaretta et al. | 370/232 |
| 2011/0151826 A1* | 6/2011 | Miller et al. | 455/404.1 |
| 2011/0199900 A1* | 8/2011 | Ludwig et al. | 370/230.1 |
| 2011/0222406 A1* | 9/2011 | Persson et al. | 370/236 |
| 2011/0235514 A1* | 9/2011 | Huang et al. | 370/235 |
| 2011/0235569 A1* | 9/2011 | Huang et al. | 370/315 |
| 2011/0261747 A1* | 10/2011 | Wang et al. | 370/315 |
| 2011/0267944 A1* | 11/2011 | Stjernholm et al. | 370/230 |
| 2012/0059944 A1* | 3/2012 | Fernandez Alonso et al. | 709/228 |
| 2012/0120831 A1* | 5/2012 | Gonsa et al. | 370/252 |
| 2012/0157132 A1* | 6/2012 | Olsson et al. | 455/458 |
| 2012/0202491 A1* | 8/2012 | Fox et al. | 455/435.1 |
| 2012/0287790 A1* | 11/2012 | Huang et al. | 370/236 |
| 2012/0307700 A1* | 12/2012 | Nordberg et al. | 370/311 |
| 2012/0320745 A1* | 12/2012 | Shi et al. | 370/230 |
| 2013/0115914 A1* | 5/2013 | Zhou et al. | 455/410 |
| 2013/0142046 A1* | 6/2013 | Zhou et al. | 370/230 |
| 2013/0143574 A1* | 6/2013 | Teyeb et al. | 455/438 |

FOREIGN PATENT DOCUMENTS

| | | |
|---|---|---|
| CN | 101394580 A | 3/2009 |
| CN | 101425959 A | 5/2009 |
| JP | 2009088957 A | 4/2009 |

\* cited by examiner

METHOD AND APPARATUS FOR ALLOCATING BEARER RESOURCES

TECHNICAL FIELD

The present invention relates to a bearer resource allocation process in the LTE (Long Term Evolution) system in the communication field, and in particular, to a method and apparatus for allocating bearer resources.

BACKGROUND ART

The 3GPP (3rd Generation Partnership Projection) Evolved Packet System (EPS) consists of the Evolved UMTS Terrestrial Radio Access Network (EUTRAN) and Evolved Packet Core (EPC). The EPC, which consists of Mobility Management Entities (MMES), Serving gateways (GWs) and Packet Data Network GWs (PDN GWs), is mainly responsible for management of mobility, processing of Non-Access-Stratum, and EPS bearer resource control and other related works.

EPS bearer is a logic aggregate of one or more service data streams, and is located between user equipment (UE) and PDN GW. When the UE does data services after attaching to the core network, it will obtain bearer resources required for the services by initiating a bearer resource allocation procedure. The EPC will allocate a bearer resource conforming to the current service for the UE according to a bearer level QoS (Quality of Service) parameter and Traffic Flow Template (TFT) carried in a request message sent by the UE in the procedure.

The UE initiates the bearer resource allocation procedure to the EPC to trigger the EPC to initiate a proprietary bearer activation procedure or proprietary bearer modification procedure to the UE. Currently, in the prior art there are the following several technical schemes for a decision mechanism for triggering the proprietary bearer activation or proprietary bearer modification:

Scheme 1: only the proprietary bearer activation procedure is triggered, and the current bearer resource allocation request of the UE is rejected once a bearer upper limit is reached.

Scheme 2: the EPC firstly searches for the local bearer context associated with the UE. If there is a bearer corresponding to a QCI (QoS Class Identifier) consistent with a QCI carried in a bearer resource allocation request message sent by the UE, the EPC initiates a proprietary bearer modification procedure; otherwise, the EPC initiates a proprietary bearer activation procedure.

The following problems mainly exist in the decision schemes described above:

Scheme 1: resource waste is caused easily; once a bearer is established, the bearer will be always occupied, whether there is data transmission or not. Thus, when the number of bearers reaches the upper limit, initiation of new services will not be accepted, thereby reducing the utilization ratio of system resources.

Scheme 2: the EPC will firstly search for the bearer context whenever it receives the bearer resource allocation request, which inevitably increases the processing delay of the system itself, and decreases the response speed of the system to the service.

SUMMARY OF THE INVENTION

The present invention provides a method and apparatus for allocating bearer resources so as to implement reasonable allocation of the bearer resources.

In order to solve the above problem, the present invention discloses a method for allocating bearer resources comprising the following steps of:

when a network side receives a bearer resource allocation request initiated by a user, if the number of currently activated 3GPP Evolved Packet System (EPS) bearers has reached or exceeded a set upper limit, the network side searching the currently activated EPS bearers according to a QoS Class Identifier (QCI) carried in the bearer resource allocation request, and if an EPS bearer corresponding to a QCI consistent with the QCI carried in the bearer resource allocation request is found, performing a proprietary bearer modification operation on the found EPS bearer to respond to the bearer resource allocation request.

The method may further comprise the network side storing EPS bearer information corresponding to all the currently activated EPS bearers in advance, the EPS bearer information including bearer identifiers, QCIs and current bearer states corresponding to the currently activated EPS bearers. The method may further comprise: after finding the EPS bearer corresponding to the QCI consistent with the QCI carried in the bearer resource allocation request, the network side determining whether the current bearer state of the found EPS bearer is an idle state, and only if yes, performing the proprietary bearer modification operation on the found EPS bearer to respond to the bearer resource allocation request.

The method may further comprise: if the network side has not found any EPS bearer corresponding to the QCI consistent with the QCI carried in the bearer resource allocation request, the network side searching for an EPS bearer with the current bearer state being the idle state according to the EPS bearer information corresponding to all the currently activated EPS bearers, and performing the proprietary bearer modification operation on the found EPS bearer to respond to the bearer resource allocation request.

The EPS bearer information may further include priorities corresponding to the currently activated EPS bearers. The method may further comprise: if the network side has not found any EPS bearer corresponding to the QCI consistent with the QCI carried in the bearer resource allocation request, the network side searching the EPS bearers according to a priority corresponding to a bearer requested by the bearer resource allocation request, and if an EPS bearer with a priority lower than the priority corresponding to the bearer requested by the bearer resource allocation request is found, performing the proprietary bearer modification operation on the found EPS bearer to respond to the bearer resource allocation request. After finding the EPS bearer with the priority lower than the priority corresponding to the bearer requested by the bearer resource allocation request, the network side further obtains the current bearer state corresponding to the found EPS bearer from the EPS bearer information corresponding to all the currently activated EPS bearers, and performs the proprietary bearer modification operation on the found EPS bearer to respond to the bearer resource allocation request only when the obtained current bearer state is the idle state.

After performing the proprietary bearer modification operation, the network side may further update and store the EPS bearer information corresponding to all the currently activated EPS bearers according to an operation result.

The present invention further discloses an apparatus for allocating bearer resources comprising a bearer allocating unit and a receiving unit, wherein the receiving unit is configured to receive a bearer resource allocation request initiated by a user, and forward the bearer resource allocation request to the bearer allocating unit; and the bearer allocating unit is configured to determine whether the number of currently activated 3GPP Evolved Packet System (EPS) bearers has reached or exceeded a set upper limit after receiving the bearer resource allocation request, search the currently activated EPS bearers according to a QoS Class Identifier (QCI) carried in the bearer resource allocation request if the number of the currently activated EPS bearers has reached or exceeded the set upper limit, and if an EPS bearer corresponding to a QCI consistent with the QCI carried in the bearer resource allocation request is found, perform a proprietary bearer modification operation on the found EPS bearer to respond to the bearer resource allocation request.

The apparatus may further comprise a bearer information storing unit configured to store EPS bearer information corresponding to all the currently activated EPS bearers, the EPS bearer information including bearer identifiers, QCIs and current bearer states corresponding to the currently activated EPS bearers. The bearer allocating unit may be further configured to search the bearer information storing unit for an EPS bearer corresponding to the QCI consistent with the QCI carried in the bearer resource allocation request. The bearer allocating unit may be further configured to, after finding the EPS bearer corresponding to the QCI consistent with the QCI carried in the bearer resource allocation request, obtain the current bearer state of the found EPS bearer from the bearer information storing unit, and perform the proprietary bearer modification operation on the found EPS bearer to respond to the bearer resource allocation request only if the obtained current bearer state is an idle state.

The bearer allocating unit may be further configured to search the bearer information storing unit for an EPS bearer with the current bearer state being the idle state if the EPS bearer corresponding to the QCI consistent with the QCI carried in the bearer resource allocation request is not found, and perform the proprietary bearer modification operation on the found EPS bearer to respond to the bearer resource allocation request.

The bearer information storing unit may be further configured to store priorities corresponding to the currently activated EPS bearers. The bearer allocating unit may be further configured to search the bearer information storing unit for an EPS bearer according to a priority corresponding to a bearer requested by the bearer resource allocation request if the EPS bearer corresponding to the QCI consistent with the QCI carried in the bearer resource allocation request is not found, and if an EPS bearer with a priority lower than the priority corresponding to the bearer requested by the bearer resource allocation request is found, perform the proprietary bearer modification operation on the found EPS bearer to respond to the bearer resource allocation request. After finding the EPS bearer with the priority lower than the priority corresponding to the bearer requested by the bearer resource allocation request, the bearer allocating unit may further obtain the current bearer state corresponding to the found EPS bearer from the bearer information storing unit, and performs the proprietary bearer modification operation on the found EPS bearer to respond to the bearer resource allocation request only when the obtained current bearer state is the idle state.

The bearer allocating unit may be further configured to update and store the EPS bearer information corresponding to all the currently activated EPS bearers stored in the bearer information storing unit according to an operation result after performing the proprietary bearer modification operation.

Using the technical schemes provided by embodiments of the present invention, waste of EPC bearer resources can be reduced effectively, the time delay can be decreased, and system utilization efficiency can be improved, thereby implementing the reasonable allocation of the bearer resources.

PREFERRED EMBODIMENTS OF THE INVENTION

The main idea of the present invention is that the EPS bearer resource allocation policy in the bearer resource allocation procedure can be implemented multi-dimensionally in conjunction with the number of the currently activated 3GPP Evolved Packet System (EPS) bearers, QCIs, priorities and current bearer states, i.e., when the number of currently activated EPS bearers has not reached a set upper limit, a proprietary bearer activation procedure can be triggered, and when the number of the currently activated EPS bearers has reached or exceeded the set upper limit, the policy can be further decided according to a QCI and/or priority of the requested bearer and any of the QCIs, priorities and current bearer states of the currently activated EPS bearers.

For example, when the number of the currently activated EPS bearers has reached or exceeded the set upper limit, the currently activated EPS bearers may be searched to determine whether there is an EPS bearer corresponding to a QCI consistent with a QCI carried in the bearer resource allocation request, and if the EPS bearer is found, a proprietary bearer modification procedure is initiated to the found EPS bearer. Preferably, when the EPS bearer corresponding to the QCI consistent with the QCI carried in the bearer resource allocation request is found, the proprietary bearer modification procedure is initiated only if the current bearer state of the found EPS bearer is determined to be an idle state.

Embodiments of the present invention will be further described below in detail in conjunction with the accompanying drawings and examples.

Figures 1, 2A:
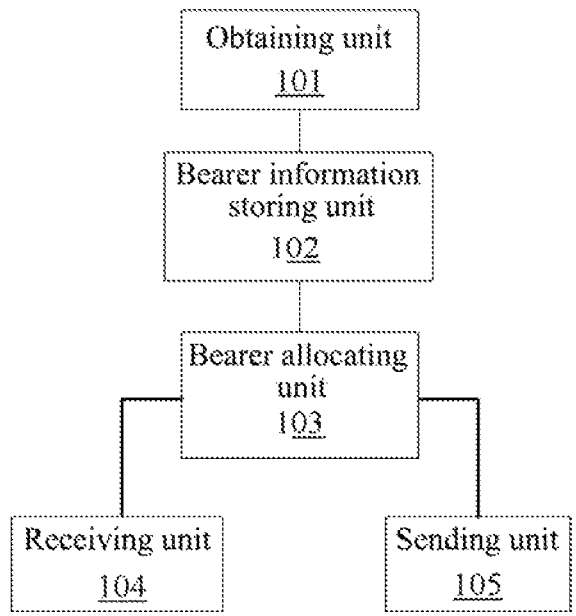
FIG. 1 is a block diagram of an apparatus for allocating bearer resources in accordance with the present invention.
FIG. 2(a) is a flowchart of a process in which the apparatus shown in FIG. 1 allocates bearer resources.

An bearer resource allocation apparatus, as shown in FIG. 1, comprises an obtaining unit 101, a bearer information storing unit 102, a bearer allocating unit 103, a receiving unit 104 and a sending unit 105.

The obtaining unit 101 is configured to obtain bearer context which has attached to UE, the current bearer state and priority, and send them to the bearer information storing unit.

The bearer information storing unit 102 is configured to store EPS bearer information of all the currently activated EPS bearers based on the information sent by the obtaining unit, wherein the EPS bearer information includes bearer identifiers (IDs), QCIs, priorities and current bearer states corresponding to the currently activated EPS bearers.

In a preferred scheme, the bearer information storing unit can store the EPS bearer information of all the currently activated EPS bearers by creating an EPS bearer information table. Specifically, the EPS bearer information table includes the bearer IDs, QCIs, priorities and especially the current bearer states of the currently activated EPS bearers.

The bearer allocating unit 103 is configured to determine a bearer resource allocation policy according to the bearer information (such as the number of the bearers, QCIs, priorities, and current bearer states) in the bearer information storing unit when the UE initiates a bearer resource allocation procedure (i.e., when a bearer resource allocation request is received), and to update all the activated EPS bearers and their corresponding EPS bearer information in the bearer information storing unit according to the execution result of the allocation policy.

The bearer allocating unit determines whether the number of the currently activated EPS bearers has reached or exceeded a set upper limit, triggers a proprietary bearer activation procedure (i.e., controls the sending unit to send an bearer context activation message) if the number has reached the set upper limit, searches the bearer information storing unit according to a QCI carried in the bearer resource allocation request if the number of the currently activated EPS bearers has reached or exceeded the set upper limit, and if an EPS bearer corresponding to a QCI consistent with the QCI carried in the bearer resource allocation request is found, performs the proprietary bearer modification operation (i.e., controls the sending unit to send a bearer context modification message) on the found EPS bearer to respond to the bearer resource allocation request. Furthermore, if the bearer allocating unit finds the EPS bearer corresponding to the QCI consistent with the QCI carried in the bearer resource allocation request, it can obtain the current bearer state of the found EPS bearer from the bearer information storing unit, and performs the proprietary bearer modification operation (i.e., controls the sending unit to send the bearer context modification message) on the EPS bearer to respond to the bearer resource allocation request only when the obtained current bearer state is the idle state.

In some schemes, when the bearer allocating unit determines that none of the QCIs corresponding to the activated EPS bearers is the same as the QCI carried in the bearer resource allocation request message initiated by the UE, it may further search the bearer information storing unit for an EPS bearer with a priority lower than the priority of the EPS bearer requested by the bearer resource allocation request, and initiate the proprietary bearer modification procedure to the found EPS bearer.

Still in some schemes, when the bearer allocating unit determines that none of the QCIs corresponding to the activated EPS bearers is the same as the QCI carried in the bearer resource allocation request message initiated by the UE, it may further search the bearer information storing unit for an EPS bearer with the current bearer state being the idle state, and then initiates the proprietary bearer modification procedure to the EPS bearer in idle state to respond to the received bearer resource allocation request.

Still in some preferred schemes, when the bearer allocating unit determines that none of the QCIs corresponding to the activated EPS bearers is the same as the QCI carried in the bearer resource allocation request message initiated by the UE, it may search the bearer information storing unit for an EPS bearer with a priority lower than the priority of the EPS bearer requested by the bearer resource allocation request and the current bearer state being the idle state, and initiates the proprietary bearer modification procedure to the EPS bearer to respond to the received bearer resource allocation request.

The receiving unit 104 is configured to receive the bearer resource allocation request message, and forward it to the bearer allocating unit.

The sending unit 105 is configured to send a bearer context activation/modification message or a bearer resource allocation rejection message under control of the bearer allocating unit.

The bearer resource allocation apparatus described above may be a stand-alone network side apparatus, or may be positioned in any one of network elements of the EPC, such as MME, Serving GW or PDN GW, etc. However, the present invention is not limited to these network elements, and a person skilled in the art can integrate functions implemented by the apparatus of the present invention into other network elements of communication systems without doing any creative work.

The process in which the bearer resource allocation apparatus performs bearer resource allocation, as shown in FIG. 2, comprises the following steps:

In step 200, after a UE attaches to a network successfully, the bearer resource allocation apparatus described above obtains and stores EPS bearer information of all the activated EPS bearers between the UE and a packet data network (PDN). The EPS bearer information includes bearer IDs, QoS class identifiers (QCIs), priorities and current bearer states (i.e., whether any data is transmitted on the bearers).

The bearer resource allocation apparatus can obtain the current bearer states of the activated EPS bearers from the transmission layer.

The bearer resource allocation apparatus can create an EPS bearer information table for storing the EPS bearer information of all the activated EPS bearers between the UE and packet data network (PDN). Specifically, the created EPS bearer information table may include user identifiers (for example UE IMSIs), bearer identifiers (for example bearer IDs), QoS class identifiers (QCIs), priorities (obtained from standard QCI characteristics) and current bearer states (whether any data is transmitted on the bearers).

The bearer resource allocation apparatus can also use EPS bearer context to store the EPS bearer information of all the activated EPS bearers between the UE and packet data network (PDN), i.e., newly add the priorities and the current bearer states of the EPS bearers on the basis of the existing EPS bearer context.

In step 201, when the UE initiates a bearer resource allocation request, the bearer resource allocation apparatus makes a decision according to the number of the currently activated bearers and the EPS bearer information of all the currently activated EPS bearers.

Figure 2B:
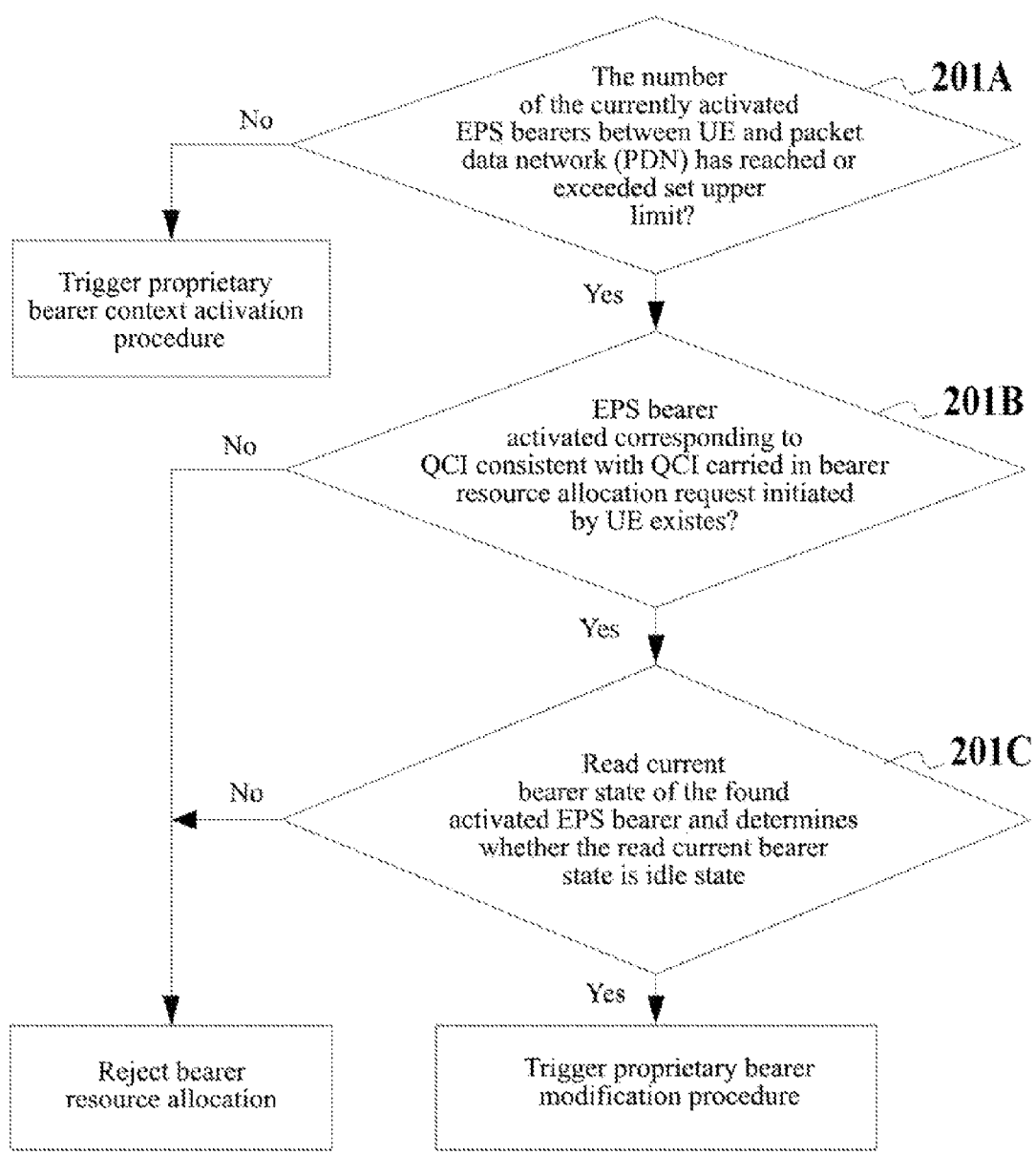
FIG. 2(b) is a flowchart of the operation in step 201 in FIG. 2(a)

This step may be further divided into the following several steps, as shown in FIG. 2(b).

In 201A, the bearer resource allocation apparatus determines whether the number of the currently activated EPS bearers between the UE and the packet data network (PDN) has reached or exceeded a set upper limit, if yes, executes step 201B, otherwise, triggers a proprietary bearer context activation procedure to respond to the received bearer resource allocation request.

In 201B, the bearer resource allocation apparatus searches the stored EPS bearer information of all the currently activated EPS bearers for an EPS bearer corresponding to a QCI consistent with the QCI carried in the bearer resource allocation request initiated by the UE, and if yes, executes step 201C, otherwise, rejects the bearer resource allocation.

In 201C, the bearer resource allocation apparatus reads the current bearer state of the found activated EPS bearer from the stored EPS bearer information of all the currently activated EPS bearers, and determines whether the read current bearer state is an idle state (i.e., no data is transmitted on the bearer), and if yes, triggers a proprietary bearer modification procedure to respond to the received bearer resource allocation request, otherwise, rejects the bearer resource allocation.

In some schemes, in step 201B, when the bearer resource allocation apparatus determines that none of the QCIs corresponding to the currently activated EPS bearers is the same as the QCI carried in the bearer resource allocation request message initiated by the UE, it may not reject the bearer resource allocation directly, but search the EPS bearer information of all the currently activated EPS bearers for an EPS bearer with a priority lower than the priority of the EPS bearer requested by the bearer resource allocation request, and initiate the proprietary bearer modification procedure to the found EPS bearer to respond to the received bearer resource allocation request.

Still in some schemes, when the bearer resource allocation apparatus determines that none of the QCIs corresponding to the currently activated EPS bearers is the same as the QCI carried in the bearer resource allocation request message initiated by the UE, it may search the EPS bearer information of all the currently activated EPS bearers for an EPS bearer with the current bearer state being the idle state, and then initiates the proprietary bearer modification procedure to the EPS bearer in the idle state to respond to the received bearer resource allocation request.

Still in some preferred schemes, when the bearer resource allocation apparatus determines that none of the QCIs corresponding to the currently activated EPS bearers is the same as the QCI carried in the bearer resource allocation request message initiated by the UE, it may search the EPS bearer information of all the currently activated EPS bearers for an EPS bearer with a priority lower than the priority of the EPS bearer requested by the bearer resource allocation request and the current bearer state being the idle state, and initiate the proprietary bearer modification procedure to the EPS bearer to respond to the received bearer resource allocation request.

In step 202, the bearer resource allocation apparatus sends the decision result to the UE, and updates and stores the EPS bearer information of all the currently activated EPS bearers according to feedback of the UE. The bearer resource allocation ends.

If the decision result is to modify a proprietary bearer, the bearer resource allocation apparatus sends a proprietary bearer context modification request which carries a modified bearer ID to the UE. At this point, the UE updates the local bearer according to the carried bearer ID after receiving the proprietary bearer context modification request, and sends a proprietary bearer context modification response to the bearer resource allocation apparatus. The bearer resource allocation apparatus receives the proprietary bearer context modification response while updating the EPS bearer information of all the currently activated EPS bearers.

If the decision result is to reject the bearer resource allocation, the bearer resource allocation apparatus returns a bearer resource allocation rejection response to the UE directly.

The specific process of bearer resource allocation will be described below in conjunction with the specific application scenes.

The First Embodiment

Figure 3:
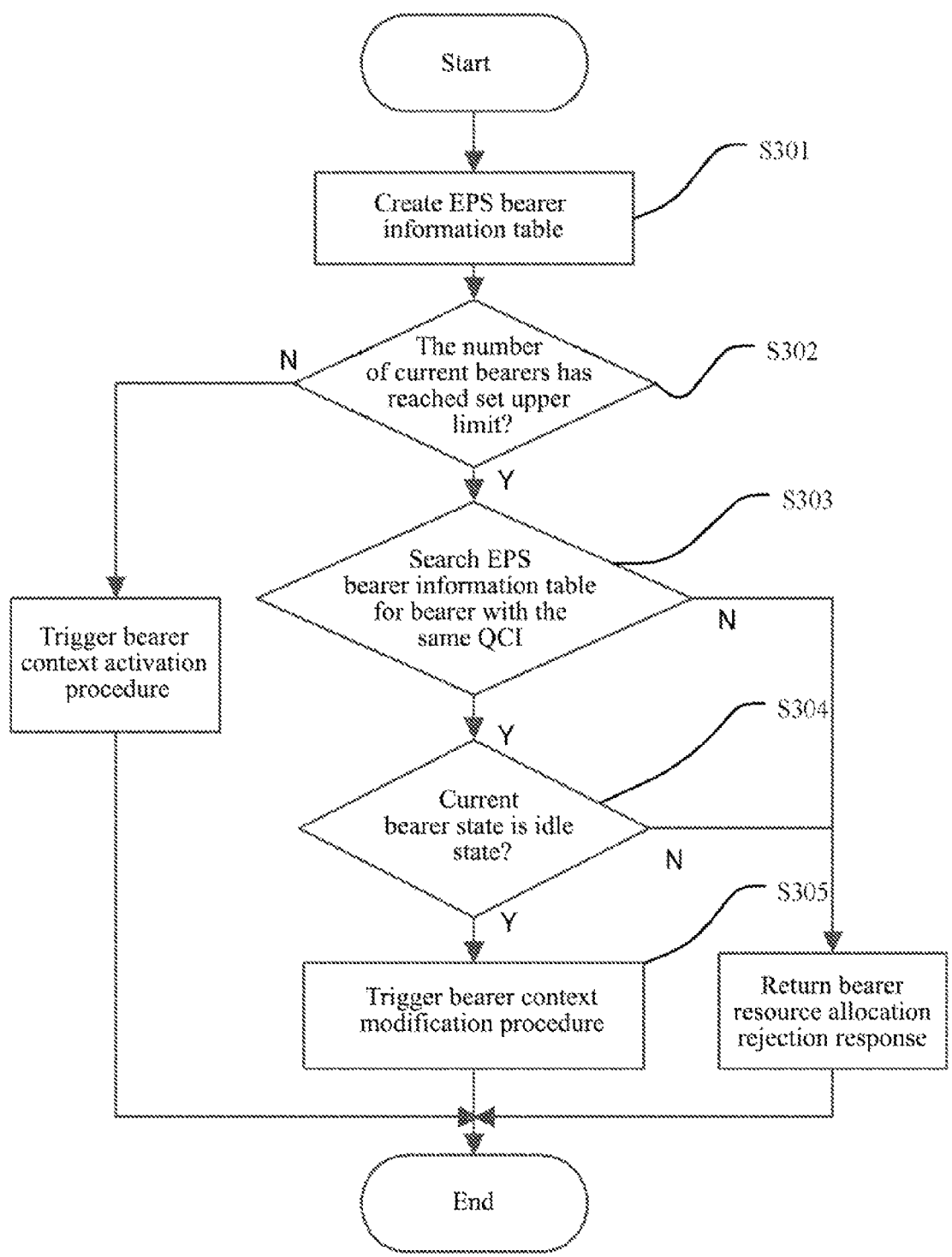
FIG. 3 is a flowchart of a specific process in accordance with the first embodiment.

This embodiment introduces a preferred scheme of bearer resource allocation, where a bearer resource allocation apparatus is positioned in a PDN GW (i.e., the PDN GW can implement the function of bearer resource allocation) in an EPC. The specific process as shown in FIG. 3 comprises the following steps:

In S301, the PDN GW in the EPC obtains EPS bearer information of the currently activated EPS bearers and creates an EPS bearer information table, which includes IMSIs of all attached UEs, IDs of the activated bearers of the UEs, QoS class identifiers (QCIs) corresponding to the bearers, priorities and current bearer states.

The IDs of the activated bearers of the UEs and QCIs can be obtained from bearer context maintained locally by the PDN GW, and the priorities are obtained by querying from a standard QCI characteristic table (e.g., Table 1) pre-configured by an operator according to the QCIs of the bearers. The current bearer state may be determined by binding a timer to each bearer. The timer is started when there is no data transmitted on the bearer. In the case of timeout of the timer, if there is still no data transmitted on the bearer, the state of the bearer in the EPS bearer information table is updated to be an idle state. The timer is stopped when there is data transmitted on the bearer, and meanwhile the bearer state is updated to be a busy state. When the PDN GW completes the bearer-related procedure, the EPS bearer information table is updated together with the local bearer context.

Table 1 is the standard QCI characteristic table

| QCI | Resource type | Priority | Data packet delay | Data packet loss rate | Typical service |
|---|---|---|---|---|---|
| 1 | GBR | 2 | 100 ms | $10^{-2}$ | Session voice |
| 2 | | 4 | 150 ms | $10^{-3}$ | Session video (live streaming media) |
| 3 | | 3 | 50 ms | $10^{-3}$ | Real-time game |
| 4 | | 5 | 300 ms | $10^{-6}$ | Non-session video (buffer streaming media) |
| 5 | Non-GBR | 1 | 100 ms | $10^{-6}$ | IMS signalling |
| 6 | | 6 | 300 ms | $10^{-6}$ | Video (buffer streaming media), TCP-based service such as www, Email, chatting, FTP, PSP file sharing, progressive scanning video |
| 7 | | 7 | 100 ms | $10^{-3}$ | Voice, video (live streaming media), interactive game |
| 8 | | 8 | 300 ms | $10^{-6}$ | Video (buffer streaming media), TCP-based service such as www, Email, chatting, FTP, PSP file sharing, progressive scanning video |
| 9 | | 9 | | | |

In S302, when the UE has attached to the PDN GW and initiated a bearer resource allocation request, the PDN GW firstly queries from the local bearer context whether the number of current bearers of the UE has reached a set upper limit, and if yes, executes to step S303, otherwise, triggers a bearer context activation procedure to respond to the received bearer resource allocation request.

In S303, the EPS bearer information table is searched for a bearer corresponding to a QCI consistent with the QCI carried in the bearer resource allocation request message of the UE, and if the bearer is found, step S304 is executed, otherwise, a bearer resource allocation rejection response is returned.

In S304, the current bearer state of the bearer is obtained from the EPS bearer information table, and whether the current bearer state is the idle state is determined, and if yes, step S305 is executed, otherwise, the bearer resource allocation rejection response is returned.

In S305, the PDN GW triggers a bearer context modification procedure, and modifies the bearer as the bearer resource requested by the UE for allocation.

Upon completion of the bearer resource allocation policy of the PDN GW, the UE responds to the bearer context activation or modification procedure. After the bearer context activation or modification procedure is completed, the bearer context is updated at the UE side and the EPC side synchronously, and the bearer resource allocation procedure ends.

The Second Embodiment

Figure 4:
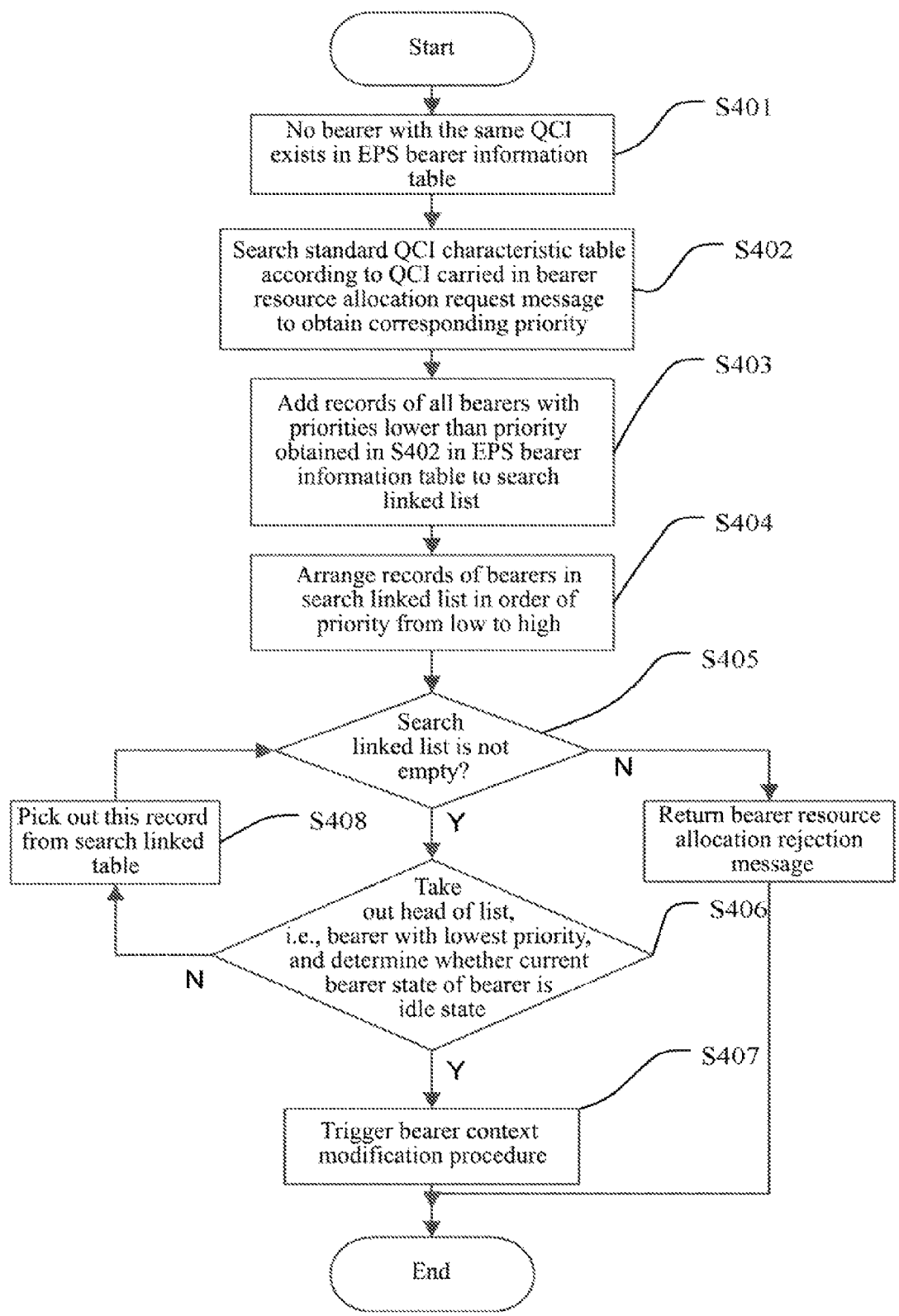
FIG. 4 is a flowchart of a crucial process in accordance with the second embodiment.

In order to improve the utilization ratio of bearer resources, this embodiment can be implemented by modifying step S303 in the first embodiment as follows. It should be noted that FIG. 4 mainly describes a flowchart of an operation procedure where no bearer corresponding to a QCI consistent with the QCI carried in the bearer resource allocation request message of the UE is found in the EPS bearer information table.

The specific modification steps include the following steps:

In S401, no bearer corresponding to the QCI consistent with the QCI carried in the bearer resource allocation request message of the UE is found in the EPS bearer information table.

In S402, the standard QCI characteristic table (e.g., Table 1) is searched according to the QCI carried in the bearer resource allocation request message of the UE to obtain the corresponding priority.

In S403, records of all bearers with priorities lower than the priority obtained in S402 in the EPS bearer information table are added to a search linked list.

In S404, the records of the bearers in the search linked list are arranged in order of priority from low to high. In this embodiment, a record of a bearer with the lowest priority may be placed at the head of the list.

In S405, whether the search linked list is empty is determined, and if yes, a bearer resource allocation rejection response is returned, otherwise, step S406 is executed.

In S406, the first record at the head of the list, i.e., the bearer with the lowest priority, is taken out, whether the current bearer state of the bearer is the idle state is determined, and if yes, step S407 is executed, otherwise, step S408 is executed.

In S407, the PDN GW triggers a bearer context modification procedure, and modifies the bearer as the bearer resource requested by the UE for allocation.

In S408, this record is picked out from the search linked table, and step S405 is executed.

Upon completion of the bearer resource allocation policy of the PDN GW, the UE responds to the bearer context activation or modification procedure. After the bearer context activation or modification procedure is completed, the bearer context is updated at the UE side and the EPC side synchronously, and the bearer resource allocation procedure ends.

It can be seen from the embodiments described above, in the technical scheme of the present invention, the EPS bearer information table is obtained and created by the PDN GW in the EPC, where the EPS bearer information table includes UE IMSIs, bearer IDs, QCIs, priorities (obtained from the standard QCI characteristic) and current bearer states (whether there is data transmitted on the bearers); then the bearer resource allocation procedure is decided to trigger the proprietary bearer activation or modification procedure according to the number of the currently activated EPS bearers and the EPS bearer information table. This method mainly has the following advantages: the proprietary bearer activation procedure will not be always triggered, in the case of inadequate resources (i.e., the number of bearers reaches the upper limit), the proprietary bearer modification procedure will be triggered, thereby efficiently improving the utilization ratio of bearer resources.

The QCI is not used as the only basis to trigger which procedure, and priority mapping and real-time bearer state update mechanism are incorporated.

Since the decision principle is to modify only the bearer with the lower priority and the bearer state being the idle state, the reliability and real-time performance of data transmission will be greatly improved, resource waste will be reduced while implementing reasonable and efficient allocation of the bearers.

The above description is only the preferred embodiments of the present invention and is not intended to limit the protection scope of the present invention. Any modification, equivalent substitution and variation made within the spirit and principle of the present invention should be covered in the protection scope of the present invention.

INDUSTRIAL APPLICABILITY

Compared with the prior art, the present invention allows waste of EPC bearer resources to be reduced effectively, the time delay to be decreased, and the system utilization efficiency to be improved, thereby implementing the reasonable allocation of the bearer resources.

What is claimed is:

1. A method for allocating bearer resources comprising:
a network side storing Evolved Packet System (EPS) bearer information corresponding to all currently activated EPS bearers in advance, wherein the EPS bearer information including bearer identifiers, QoS Class Identifiers (QCIs), current bearer states and priorities corresponding to the currently activated EPS bearers;
when the network side receives a bearer resource allocation request initiated by a user, and a count of currently activated EPS bearers has reached or exceeded a set upper limit, the network side searching the currently activated EPS bearers according to a QCI carried in the bearer resource allocation request;
when the network side does not find any EPS bearer corresponding to the QCI consistent with the QCI carried in the bearer resource allocation request, the network side searching the EPS bearers according to a priority corresponding to the bearer requested by the bearer resource allocation request;
when an EPS bearer with a priority lower than the priority corresponding to the bearer requested by the bearer resource allocation request is found, the network side obtaining a current bearer state corresponding to the found EPS bearer from the EPS bearer information corresponding to all the currently activated EPS bearers, and performing a proprietary bearer modification operation on the found EPS bearer to respond to the bearer resource allocation request only when the obtained current bearer state is the idle state.

2. The method according to claim 1, further comprising:
when finding the EPS bearer corresponding to the QCI consistent with the QCI carried in the bearer resource allocation request, the network side determining whether the current bearer state of the found EPS bearer is an idle state, and only if yes, performing the proprietary bearer modification operation on the found EPS bearer to respond to the bearer resource allocation request.

3. The method according to claim 2, further comprising:
after performing the proprietary bearer modification operation, the network side updating and storing the EPS bearer information corresponding to all the currently activated EPS bearers according to an operation result.

4. The method according to claim 1, further comprising:
after performing the proprietary bearer modification operation, the network side updating and storing the EPS bearer information corresponding to all the currently activated EPS bearers according to an operation result.

5. An apparatus for allocating bearer resources comprising a processor and a non-transitory computer-readable medium in which a set of processor executable instructions are stored and when the instructions are executed, it causes the processor to perform the steps in following units:
  a bearer information storing unit storing Evolved Packet System (EPS) bearer information corresponding to all currently activated EPS bearers, wherein the EPS bearer information including bearer identifiers, QoS Class Identifiers (QCIs) and current bearer states corresponding to the currently activated EPS bearers;
  a receiving unit receiving a bearer resource allocation request initiated by a user, and forward the bearer resource allocation request to a bearer allocating unit; and
  a bearer allocating unit determining whether a count of currently activated EPS bearers has reached or exceeded a set upper limit after receiving the bearer resource allocation request, and when the count of the currently activated EPS bearers has reached or exceeded the set upper limit, searching an EPS bear in the currently activated EPS bearers according to a QCI carried in the bearer resource allocation request;

when an EPS bearer corresponding to the QCI consistent with the QCI carried in the bearer resource allocation request is not found, searching an EPS bearer according to a priority corresponding to the bearer requested by the bearer resource allocation request;

when an EPS bearer with a priority lower than the priority corresponding to the bearer requested by the bearer resource allocation request is found, obtaining a current bearer state corresponding to the found EPS bearer from the bearer information storing unit, and performing the proprietary bearer modification operation on the found EPS bearer to respond to the bearer resource allocation request only when the obtained current bearer state is the idle state.

6. The apparatus according to claim 5, wherein
the bearer allocating unit is further configured to, after finding the EPS bearer corresponding to the QCI consistent with the QCI carried in the bearer resource allocation request, obtain the current bearer state of the found EPS bearer from the bearer information storing unit, and perform the proprietary bearer modification operation on the found EPS bearer to respond to the bearer resource allocation request only when the obtained current bearer state is an idle state.

7. The apparatus according to claim 6, wherein
the bearer allocating unit is further configured to update and store the EPS bearer information corresponding to all the currently activated EPS bearers stored in the bearer information storing unit according to an operation result after performing the proprietary bearer modification operation.

* * * * *